US009983905B2

(12) United States Patent
Tobias et al.

(10) Patent No.: US 9,983,905 B2
(45) Date of Patent: May 29, 2018

(54) APPARATUS AND SYSTEM FOR REAL-TIME EXECUTION OF ULTRASOUND SYSTEM ACTIONS

(71) Applicant: White Eagle Sonic Technologies, Inc., Santa Clara, CA (US)

(72) Inventors: Richard Tobias, San Jose, CA (US); Bicheng Wu, Palo Alto, CA (US); Ashish Parikh, Los Altos, CA (US)

(73) Assignee: White Eagle Sonic Technologies, Inc., Santa Clara, CA (US)

(*) Notice: Subject to any disclaimer, the term of this patent is extended or adjusted under 35 U.S.C. 154(b) by 292 days.

(21) Appl. No.: 14/098,459

(22) Filed: Dec. 5, 2013

(65) Prior Publication Data

US 2014/0160895 A1 Jun. 12, 2014

Related U.S. Application Data

(60) Provisional application No. 61/734,067, filed on Dec. 6, 2012, provisional application No. 61/734,291, filed (Continued)

(51) Int. Cl.
*G06F 9/48* (2006.01)
*B06B 1/02* (2006.01)

(52) U.S. Cl.
CPC .......... *G06F 9/4843* (2013.01); *B06B 1/0207* (2013.01)

(58) Field of Classification Search
CPC .............................. G01S 7/52098; G01K 11/18
See application file for complete search history.

(56) References Cited

U.S. PATENT DOCUMENTS 4,287,768 A 9/1981 Hayakawa et al.
4,572,202 A 2/1986 Thomenius
(Continued)

FOREIGN PATENT DOCUMENTS

CN 1179298 A 4/1998
CN 1646064 A 7/2005
(Continued)

OTHER PUBLICATIONS

U.S. Appl. No. 14/098,569 Office Action dated Nov. 4, 2015.
(Continued)

*Primary Examiner* — Hovhannes Baghdasaryan
(74) *Attorney, Agent, or Firm* — Womble Bond Dickinson (US) LLP

(57) ABSTRACT

Apparatus for real-time execution of ultrasound system actions includes processor and memory to store instructions. Execution of the instructions causes processor to receive a task list including task actions that include next task action in task list. Next task action includes task instructions. Processor determines whether next task instruction in next task action is a timed instruction that includes a timestamp field having a time value indicating a time at which next task action is to be executed, and a hardware-enable field indicating hardware elements required to be available before execution of timed instruction. If next task instruction is not a timed instruction, processor may execute next task instruction. If next task instruction is timed instruction, processor determines whether time value has expired. If time value has expired, processor signals an error has occurred, and if time value has not expired, processor waits for time value. Other embodiments are described.

25 Claims, 2 Drawing Sheets

Related U.S. Application Data on Dec. 6, 2012, provisional application No. 61/746,093, filed on Dec. 26, 2012.

(56) References Cited

U.S. PATENT DOCUMENTS

| | | | |
|---|---|---|---|
| 5,119,342 A | 6/1992 | Harrison, Jr. et al. | |
| 5,121,361 A | 6/1992 | Harrison, Jr. et al. | |
| 5,140,192 A | 8/1992 | Nogle | |
| 5,641,908 A * | 6/1997 | Hayakawa | A61B 8/06 310/317 |
| 5,680,865 A | 10/1997 | Tanaka | |
| 5,709,209 A | 1/1998 | Friemel et al. | |
| 5,787,889 A | 8/1998 | Edwards et al. | |
| 5,797,846 A * | 8/1998 | Seyed-Bolorforosh | G01S 7/52025 600/447 |
| 5,919,138 A | 7/1999 | Ustuner | |
| 5,921,932 A | 7/1999 | Wright et al. | |
| 5,928,152 A | 7/1999 | Wright et al. | |
| 6,029,116 A | 2/2000 | Wright et al. | |
| 6,124,828 A | 9/2000 | Champeau | |
| 6,126,601 A | 10/2000 | Gilling et al. | |
| 6,126,607 A | 10/2000 | Whitmore et al. | |
| 6,402,693 B1 | 6/2002 | Emery | |
| 6,436,049 B1 | 8/2002 | Kamiyama et al. | |
| 6,438,401 B1 | 8/2002 | Cheng et al. | |
| 6,459,925 B1 | 10/2002 | Nields et al. | |
| 6,468,212 B1 | 10/2002 | Scott et al. | |
| 6,526,163 B1 | 2/2003 | Halmann et al. | |
| 6,567,687 B2 | 5/2003 | Front et al. | |
| 6,585,651 B2 | 7/2003 | Nolte et al. | |
| 6,714,667 B1 | 3/2004 | Mooney et al. | |
| 6,839,762 B1 | 1/2005 | Yu et al. | |
| 6,980,419 B2 | 12/2005 | Smith et al. | |
| 7,022,075 B2 | 4/2006 | Grunwald et al. | |
| 7,043,063 B1 | 5/2006 | Noble et al. | |
| 7,069,425 B1 | 6/2006 | Takahashi | |
| 7,115,093 B2 | 10/2006 | Halmann et al. | |
| 7,117,134 B2 | 10/2006 | Dubois et al. | |
| 7,280,473 B2 | 10/2007 | Wu et al. | |
| 7,347,820 B2 | 3/2008 | Bonnefous | |
| 7,450,130 B2 | 11/2008 | Swedberg et al. | |
| 7,514,069 B2 | 4/2009 | Achilefu et al. | |
| 7,536,535 B2 | 5/2009 | Wood | |
| 7,648,461 B2 | 1/2010 | Thiele | |
| 7,850,912 B2 | 12/2010 | Favuzzi et al. | |
| 7,991,986 B2 | 8/2011 | Yamamoto et al. | |
| 8,081,806 B2 | 12/2011 | Friedman et al. | |
| 8,096,949 B2 | 1/2012 | Chen et al. | |
| 8,167,803 B2 | 5/2012 | McMorrow et al. | |
| 8,226,560 B2 | 7/2012 | Arai et al. | |
| 8,248,885 B2 | 8/2012 | Ma et al. | |
| 8,287,471 B2 | 10/2012 | Liu et al. | |
| 8,289,284 B2 | 10/2012 | Glynn et al. | |
| 2002/0177878 A1 * | 11/2002 | Poore | A61N 1/025 607/9 |
| 2002/0198454 A1 | 12/2002 | Seward et al. | |
| 2003/0045795 A1 | 3/2003 | Bjaerum et al. | |
| 2003/0135712 A1 | 7/2003 | Theis | |
| 2004/0006272 A1 | 1/2004 | Vortman et al. | |
| 2004/0019447 A1 | 1/2004 | Shachar | |
| 2004/0250050 A1 | 12/2004 | Ludden et al. | |
| 2004/0254465 A1 | 12/2004 | Sano et al. | |
| 2005/0074154 A1 | 4/2005 | Georgescu et al. | |
| 2005/0075566 A1 * | 4/2005 | Satoh | A61B 8/06 600/443 |
| 2006/0004606 A1 | 1/2006 | Wendl et al. | |
| 2006/0058673 A1 | 3/2006 | Aase et al. | |
| 2006/0116578 A1 | 6/2006 | Grunwald et al. | |
| 2006/0288194 A1 | 12/2006 | Lewis et al. | |
| 2007/0255139 A1 | 11/2007 | Deschinger et al. | |
| 2007/0258631 A1 | 11/2007 | Friedman et al. | |
| 2007/0258632 A1 | 11/2007 | Friedman et al. | |
| 2007/0259158 A1 | 11/2007 | Friedman et al. | |
| 2007/0260861 A1 | 11/2007 | Kaabouch et al. | |
| 2008/0033292 A1 | 2/2008 | Shafran | |
| 2008/0077820 A1 | 3/2008 | Jensen et al. | |
| 2008/0126639 A1 | 5/2008 | Oakes et al. | |
| 2008/0146922 A1 | 6/2008 | Steins et al. | |
| 2008/0242993 A1 | 10/2008 | Shin | |
| 2008/0249407 A1 | 10/2008 | Hill et al. | |
| 2008/0249410 A1 | 10/2008 | Okuno | |
| 2008/0300487 A1 | 12/2008 | Govari et al. | |
| 2009/0012394 A1 | 1/2009 | Hobelsberger et al. | |
| 2009/0043195 A1 | 2/2009 | Poland | |
| 2009/0089555 A1 | 4/2009 | Cataldo et al. | |
| 2009/0138318 A1 | 5/2009 | Hawkins et al. | |
| 2009/0187099 A1 | 7/2009 | Burcher | |
| 2010/0016719 A1 | 1/2010 | Freiburger et al. | |
| 2010/0017750 A1 | 1/2010 | Rosenberg et al. | |
| 2010/0023886 A1 | 1/2010 | Shin et al. | |
| 2010/0031211 A1 | 12/2010 | Ogasawara et al. | |
| 2010/0324420 A1 * | 12/2010 | Snook | A61B 8/00 600/443 |
| 2011/0201900 A1 * | 8/2011 | Zhang | G06F 19/3487 600/300 |
| 2011/0288413 A1 * | 11/2011 | Baba | A61B 8/06 600/441 |
| 2012/0092527 A1 | 4/2012 | Lavin et al. | |
| 2012/0157842 A1 | 6/2012 | Davis et al. | |
| 2012/0157843 A1 | 6/2012 | Lavin et al. | |
| 2013/0116561 A1 | 5/2013 | Rothberg et al. | |
| 2013/0251221 A1 | 9/2013 | Harrison | |
| 2013/0263511 A1 | 10/2013 | Agam et al. | |

FOREIGN PATENT DOCUMENTS

| | | |
|---|---|---|
| EP | 0829735 A2 | 3/1998 |
| WO | WO2012123942 A1 | 9/2012 |

OTHER PUBLICATIONS

U.S. Appl. No. 14/098,472 Office Action dated Nov. 30, 2015.
U.S. Appl. No. 14/098,464 Office Action dated Jul. 16, 2015.
PCT: Notification of Transmittal of the International Search Report and the Written Opinion of the International Searching Authority, or the Declaration dated Feb. 24, 2014 for International Application No. PCT/US2013/073554, International Filing Date Dec. 6, 2013.
U.S. Appl. No. 14/098,469 Final Office Action dated May 18, 2016.
U.S. Appl. No. 14/098,472 Final Office Action dated May 23, 2016.
U.S. Appl. No. 14/098,472 Office Action dated Aug. 26, 2016.
CN Patent Application 201380071646.2 Office Action dated Sep. 28, 2016.
Extended Search Report for European Application No. EP13860141 dated Jun. 29, 2016.
Office Action for U.S. Appl. No. 14/098,452 dated Nov. 22, 2016.
Office Action for U.S. Appl. No. 14/098,464 dated Jan. 11, 2017.
Office Action for U.S. Appl. No. 14/098,472 dated Mar. 28, 2017.
U.S. Appl. No. 14/098,444 Office Action dated Mar. 25, 2016.
U.S. Appl. No. 14/098,464 Office Action dated Feb. 5, 2016.
U.S. Appl. No. 14/098,452 Office Action dated Feb. 5, 2016.

* cited by examiner

APPARATUS AND SYSTEM FOR REAL-TIME EXECUTION OF ULTRASOUND SYSTEM ACTIONS

This application claims the benefit pursuant to 35 U.S.C. 119(e) of U.S. Provisional Application No. 61/746,093, filed on Dec. 26, 2012, which application is specifically incorporated herein, in its entirety, by reference.

CROSS-REFERENCED AND RELATED APPLICATIONS

This application claims the benefit pursuant to 35 U.S.C. 119(e) of U.S. Provisional Application No. 61/734,067, filed on Dec. 6, 2012, which application is specifically incorporated herein, in its entirety, by reference.

This application claims the benefit pursuant to 35 U.S.C. 119(e) of Provisional U.S. Application No. 61/734,291, filed on Dec. 6, 2012, which application is specifically incorporated herein, in its entirety, by reference.

TECHNICAL FIELD

Embodiments of the invention generally relate to apparatuses and systems that execute actions that have precise timing requirement and more particularly, some embodiments relate to imaging systems that execute ultrasound actions in real time.

BACKGROUND

Many industrial, medical, and other embedded systems have rigorous real-time requirements. For example, ultrasound systems need to fire different types of beams at specific times and have multiple real-time constraints.

Today's ultrasound systems have limited, fixed functionality and require sophisticated user control. Most ultrasound systems cannot provide multiple simultaneous functions. The ultrasound systems that can provide multiple simultaneous functions have the functions as fixed functions that are not flexible to user demands or need for adaptation. Accordingly, in these systems, a selection between different functions may be available, however, no deviations that relate, for example, to timing of the fixed functions is possible. For example, in the case of ultrasound systems, it may be possible to have a Doppler beam and a B-mode beam. The combined functions of the different beams are provided as preprogrammed solutions. These solutions are selected, for example, by using a touch of a button. However, there is no flexibility provided to the user of the system for changes that require the reconfiguring and reshuffling of the timed scheduled actions that are included in the preprogrammed solutions.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings.

DETAILED DESCRIPTION

Figure 1:
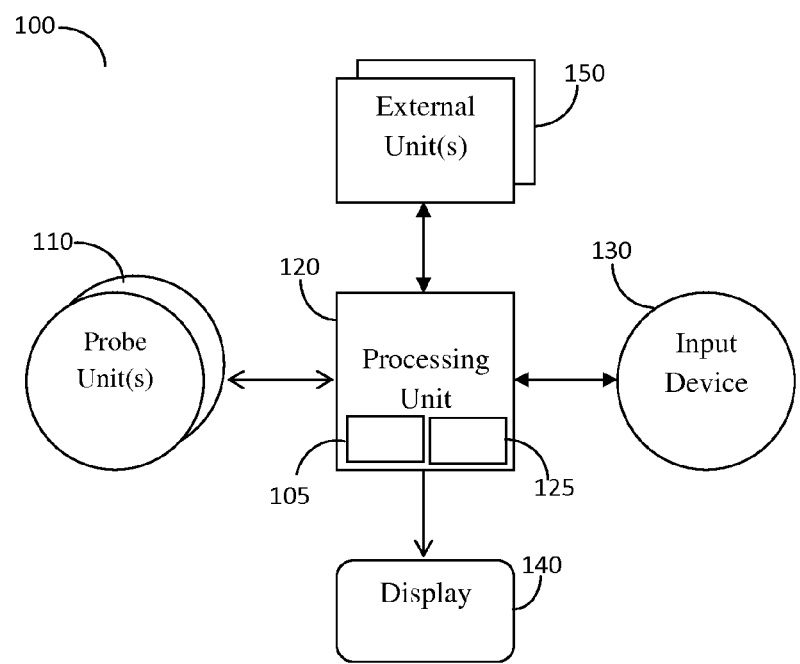
FIG. 1 shows an ultrasound system including an adaptive scheduler for executing ultrasound system actions in real time according to an embodiment of the invention.

In the following description, numerous specific details are set forth. However, it is understood that embodiments of the invention may be practiced without these specific details. In other instances, well-known circuits, structures, and techniques have not been shown to avoid obscuring the understanding of this description.

In the description, certain terminology is used to describe features of the invention. For example, in certain situations, the terms "component," "unit," "module," and "logic" are representative of hardware and/or software configured to perform one or more functions. For instance, examples of "hardware" include, but are not limited or restricted to an integrated circuit such as a processor (e.g., a digital signal processor, microprocessor, application specific integrated circuit, a micro-controller, etc.). Of course, the hardware may be alternatively implemented as a finite state machine or even combinatorial logic. An example of "software" includes executable code in the form of an application, an applet, a routine or even a series of instructions. The software may be stored in any type of machine-readable medium.

A sophisticated ultrasound system supports multiple simultaneous functions such as imaging, blood flow measurement and heartbeat monitoring. The ultrasound system performs these functions by executing sequences of actions such as firing beams, receiving beam data, and moving mechanical arms. These actions frequently have rigorous real-time requirements. The ultrasound system performs functions by executing one or more parallel tasks, where each task requires a sequence of actions. The ultrasound system cannot perform conflicting actions at the same time. Accordingly, in some embodiments, actions conflict if they require the same resource, e.g., the same transmitter, the same receiver or the same area of memory. In other embodiments, actions conflict if the ultrasound beams from two different transmitters travel through the same area of the target and make it impossible for a receiver to identify the source.

Further, some actions depend on events that cannot be accurately predicted. For example, the system may need to wait for a mechanical arm to complete its movement before it fires the next beam. The system must wait for a laser to be charged before it can fire a laser beam. The time taken to charge a laser varies significantly and cannot be predicted to the required accuracy. The ultrasound system indicates the completion of mechanical movement or laser charging by signaling events. Thus, some actions may depend on asynchronous events.

Accordingly, in some embodiments, the ultrasound system supports changes to the list of parallel tasks. For instance, a human user may view an ultrasound image and request new functions to be performed. An automated system may change the list of tasks in response to analysis of the ultrasound results. In some embodiments, the automated system uses the adaptive scheduler to schedule actions from the updated task list. Scheduling the actions may include signaling to a processor to send commands to other units to perform the actions. The adaptive scheduler may be implemented in hardware, software, firmware or any combination thereof as discussed below. In prior ultrasound systems, a skilled human operator is required to analyze results and modify ultrasound parameters. For example, an ultrasound operator may wish to locate a human heart valve, monitor the heart rate and measure the shape of the heart valve movement. In one embodiment of the invention, the automated system employs analysis software to monitor the ultrasound results. The analysis software determines the required task-list changes and signals an appropriate event to the adaptive scheduler. The analysis software modifies the task-list while searching for the heart valve. The analysis software starts new tasks when the ultrasound system locates the heart valve. Thus, the ultrasound system needs to respond to events that change the task list (e.g., when it receives an event indicating that the heart valve is located from the analysis software or from the end user). In this example, the event may be a signal received by the adaptive scheduler that indicates that the heart valve is located. The signal may be a single bit digital signal wherein the high signal ('1') may indicate that the heart valve is located.

Accordingly, in one embodiment of the invention, the adaptive scheduler further described below handles the scheduling of task actions. Each task to be performed may include a plurality of task actions. For instance, a task to be performed by the ultrasound system may be measuring the blood flow. The task actions included in the task of measuring the blood flow may include: firing one of the beams, and collecting the data (e.g., ultrasound data) from the beam. The adaptive scheduler adapts the schedule of task actions to ensure that actions do not conflict. When adapting the schedule of task actions, if actions are found to conflict, in one embodiment, the adaptive scheduler ensures that high priority actions are handled prior to lower priority actions. The adaptive scheduler handles events. The events may be signals received by the adaptive scheduler that indicate the completion of certain tasks or task actions. For example, when an external unit (e.g., robot arm) has completed the movement required, the event received may be a signal that indicates that the external unit has completed the movement. The events may also be a signal received from an input device that indicates that a list of tasks has been inputted by the user. In some embodiments, events can cause the adaptive scheduler to pause task actions, modify task parameters, add or delete tasks and to invoke software procedures such as analysis software for locating a heart valve. In other embodiments, in response to events, the adaptive scheduler sends a signal to the processor to send commands to probe units or external units to start executing a task action. For instance, in response to receiving an event that indicates that data has been collected from a first beam associated with a higher priority, the adaptive scheduler may signal to the processor to send a start command to the second beam of a lower priority. In some embodiments, the adaptive scheduler sends the commands to the probe units or external units instead of the processor.

In one embodiment, an apparatus controls various hardware elements by executing task actions at precise times and checking the hardware elements' status. The apparatus may include a processor that executes instructions at specific times. The processor may check the availability of hardware elements coupled to the apparatus before executing the instructions. The processor may also signal timing violations. In one embodiment, the apparatus controls the beam firing of an ultrasound system.

FIG. 1 shows an ultrasound system including an adaptive scheduler for executing ultrasound system actions in real time according to an embodiment of the invention. As shown in FIG. 1, the ultrasound system 100 may include an adaptive scheduler 105. In one embodiment, the adaptive scheduler 105 is coupled to one or more probe units 110. Each probe unit 110 typically controls one or more transducers embodied therein. The transducers typically contain multiple elements capable of transmitting and receiving ultrasound beams. In one embodiment, the adaptive scheduler 105 is part of a processing unit 120 that handles user interactions, image display and system control. In one embodiment, the adaptive scheduler 105 is implemented as a software procedure executing on a processor. In some embodiments, the adaptive scheduler 105 includes a dedicated processor that is only used for adaptive scheduling. In a second embodiment the adaptive scheduler 105 is implemented in hardware. For instance, the adaptive scheduler 105 may include application-specific integrated circuit (ASIC) and/or field-programmable gate array (FPGA). The processing unit 120 may include a microprocessor, a microcontroller, a digital signal processor, or a central processing unit, and other needed integrated circuits such as glue logic. The term "processor" may refer to a device having two or more processing units or elements, e.g. a CPU with multiple processing cores. The processing unit 120 may be used to control the operations of the adaptive scheduler 105. For example, the processing unit 120 may executes software to control the adaptive scheduler 105 (e.g. to transmit and receive data to other components of system 100 (e.g., external units 150, probe unit 110). In some cases, a particular function may be implemented as two or more pieces of software that are being executed by different hardware units of a processor.

In one embodiment, the processing unit 120 sends probe control commands, telling the probe units 110 when to fire specific beams and when to collect data. Such operation, as explained in further detail herein below, is performed, for example, from a memory 125 containing instructions that are executed by the processing unit 120. A memory 125 may also be included in the adaptive scheduler 105. The memory 125 that may include one or more different types of storage such as hard disk drive storage, nonvolatile memory, and volatile memory such as dynamic random access memory. The memory 125 may also include a database that stores data received from the probe units 110 and the external units 150. The memory 125 may also store instructions (e.g. software; firmware), which may be executed by the processing unit 120. As multiple operations of the ultrasound system may be needed (e.g., firing beams at various times), a task list is generated and altered by the adaptive scheduler 105 to address the combination of actions that are desired by the user of the system 100, further described herein. This embodiment of the invention provides for flexibility that is not achievable in prior art systems. The processing unit 120 is configured to further retrieve data collected by a probe unit 110 data. The processing unit 120 takes input commands from one or more input devices 130. The input devices 130 may be a keyboard, mouse, or touch screen that allows a user to input commands.

The input devices 130 typically provide high-level commands to the processing unit 120 which in turn, under control of the embedded instruction memory 125 performs at least the tasks described in greater detail herein below. The processing unit 120 may output at least a result respective of the data collected to, for example, a display unit 140 that is coupled to the processing unit 120. A display unit 140 may be replaced or augmented by a storage unit (not shown) to allow the storing of the collected data for future use. The display unit 140 may show an image, a video comprised of a series of image frames, text, as well as combinations thereof.

While a single adaptive scheduler is referenced herein the use of a plurality of adaptive schedulers is possible without departing from the scope of the invention. As discussed above, the adaptive scheduler may be implemented in hardware, for example through a configurable circuit, or in memory of the system 100, where the memory is loaded with instructions, which when executed by the processor, causes the processor to perform methods of adaptively scheduling the task actions or cause the processor to control the adaptive scheduler, or adaptive schedulers. In one embodiment, cycle accurate timing for the firing of the beams is provided by the system 100 based, at least in part on the directions or signals received from the adaptive scheduler. In some embodiments, the adaptive scheduler may be used to configure at least a probe unit.

In an embodiment, the ultrasound system 100 may control one or more external units 150, such as lasers, robot arms and motors. The external units 150 may also require time synchronization with probe units 110 operations. In one embodiment, the processing unit 120 sends external units 150 control commands based on the adaptive scheduler 105's selected task action as further explained below. For example, the processing unit 120 may send a control command telling a robot arm (e.g., external unit 150) to move a probe upon receipt of a signal from the adaptive scheduler 105 that received an event indicating that a unit of data has been collected.

The ultrasound system 100 may receive a specification of ultrasound system tasks and events through, for example, input devices 130. The ultrasound system 100 generates a task identifying a sequence of task actions. Some of the task actions may have real-time constraints and some may depend on events. For instance, some task actions may not start until an event is received by the adaptive scheduler 105. For example, the task action may be to move a robot arm which cannot begin until an event is received that indicates that the data from a beam is finished being collected. In one embodiment, the ultrasound system 100 computes the time needed to complete each task action in the specification received. The ultrasound system 100 generates a list of the task actions using a linked list in memory 125. In some embodiments, the specification may include tasks and events that are associated with multiple beam firings of different types. A beam firing task action may require a setup time which is the amount of time needed to configure the transducer before firing a beam. The setup time may depend on the transducer. Different beam firing types are called modes. Switching modes (for example, switching from B-Mode mode to color-flow Doppler) typically requires a mode switching delay. The switching delay acts as an additional setup time. Each beam firing task action has a firing time, also known as pulse duration, which is the amount of time that the transducer outputs ultrasound waves. The firing time depends of the beam type and the purpose of the beam firing. For instance, a shorter firing time can give a better quality image. Doppler beams have a longer firing period than B-Mode beams. Each beam also has a collection time, which is the time needed to receive the reflected or pass-through ultrasound waves. The ultrasound propagation time depends on the medium through which the beam passes. The collection time depends on the depth of the scan. The ultrasound system 100 may need to distinguish the source of the collected data. Accordingly, the ultrasound system 100 may avoid two beams firing at the same time. A "dead-time" time interval between data collection and the next beam firing may also be introduced as needed.

Some beam types have a pulse repetition period which is the time between successive firings. Successive firings lead to the construction of a single image. Repeating this sequence of firings can generate multiple images. The ultrasound system 100 may, for instance, have a requirement to generate 60 images per second. Doppler beams have a pulse repetition period whereas B-mode scan beams do not.

Some beam firings need to be consecutive in time. Using multi-focal-zones allows the ultrasound system 100 to get significantly better image quality. The ultrasound system 100 scans with beams focused at different distances. The ultrasound system 100 may scan with the first beam focused at 0-5 centimeters (cm), a second beam focused at 5-10 cm and a third beam focused at 10-15 cm. The data collected from the three different levels may be combined to form one line of an image. This beam firing sequence can be repeated using different collectors to generate a complete image. The ultrasound system 100 may need to schedule the actions that generate a single line consecutively.

In one embodiment, the processing unit 120 receives an input specification including a list of tasks (or task list) to be performed that includes ultrasound tasks and external unit tasks. Each ultrasound task may include, for example: the beam type, the number of beam firings, the setup time, the firing time, the dead-time, the pulse repetition period, the desired images per second rate, the number of multi-focal zones, and other timing constraints. Each external unit function (e.g., an external unit task) may include, for example: desired external unit task actions and the desired external unit task actions' timing constraints. The desired external unit task action may be for example a movement of a robot arm. The processing unit 120 or the adaptive scheduler 105 processes each task description and produces a list of sequential task actions such as beam firing actions and data collection actions. The task list may also include a plurality of tasks that are associated with a plurality of beams of differing priority levels. In some embodiments, the plurality of tasks includes at least one of a photoacoustic laser firing task and an electrocardiogram (ECG) task.

In one embodiment, the processing unit 120 creates a schedule of timing actions ("task list") and selects a task action following the method described herein. It should be understood that the processing unit 120, in one embodiment, may schedule the dependent or independent operation of a plurality of probe units 110 coupled to the probe interface 230 such that their beam firing is either dependent or independent of each other. Each of the probe units 110 may have, for example, its own task list of ultrasound actions that may be adaptively modified by the adaptive scheduler 105. In another embodiment, a single task list that may be adaptively modified by the adaptive scheduler may be used to cause the firing of beams by at least one of the plurality of probe units 110. Similarly, a plurality of external units 150 may be coupled to the probe interface 230 illustrated in FIG. 2, or in one embodiment, a dedicated interface (not shown) used to couple a plurality of external devices 150 to the processing unit 120. In one embodiment, the adaptive scheduler 105 may use one or more task lists to cause the operation of the one or more probe units 110 and the one or more external units 150. These operations being performed independent or dependent of each other. As discussed above, the ultrasound system 100 may receive a specification of ultrasound system tasks and events through, for example, a feedback resulting from measurements made by the system 100 or from input devices 130 (e.g., a change requested by a user of the system 100 by entering an input). These changes may occur in real-time as the system 100 executes the task list including the tasks that may include tasks and task actions that were earlier entered to the system 100. It should be further understood that task actions included in the task lists may be added as well as removed in real-time by the adaptive scheduler 105 and the task actions included in the task lists may also be added and removed when the system 100 is off-line for reconfiguration.

Figure 2:
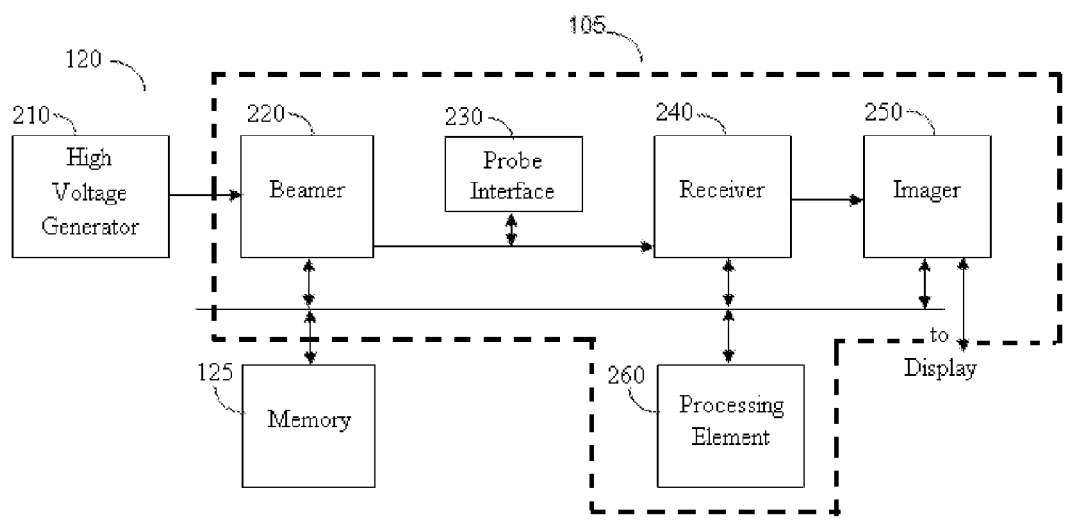
FIG. 2 shows a block diagram representation of the details of the processing unit of the ultrasound system according to an embodiment of the invention.

FIG. 2 shows a block diagram representation of the details of the processing unit of the ultrasound system according to an embodiment of the invention. In this embodiment, the processing unit 120 comprises a high voltage generator 210, the memory 125 and the adaptive scheduler 105. The adaptive scheduler 105 may comprise a beamer 220, a probe interface 230, a receiver 204, an imager 250 and a processing element 260. In some embodiments, the adaptive scheduler 105 also includes the high voltage generator 210 and the memory 125. In the embodiment in FIG. 2, the high voltage generator 210 is coupled to the beamer 220 and provides the high voltage necessary for the proper operations of at least the probes 110. In one embodiment, the probes 110 may be coupled to the processing unit 120 through probe interface 230 which is coupled to the beamer 220. In one embodiment, the beamer 220 generates control signals that control different functions of the probes 110 (e.g., controls the firing of their beams). The beamer 220 may also generate the high voltage transmission signals that are converted by transducers included in the probe 110 into the ultrasound signals that are fired by the probes 110. The beamer 220 may provide the control signals and/or the high voltage transmission signals to the probes 110 via the probe interface 230. In one embodiment, the probe interface 230 is also used to interface to the external units 150. As shown in FIG. 2, the probe interface 230 may further coupled to a receiver 240. The receiver 240 may receive and shape or process data signals from at least one of the probe units 110 into a useable form. For instance, the probe unit 110 generates ultrasound signals that are fired onto an object (e.g., human body) and the "bounce back" signal from the object is received by the probe unit 110. The "bounce back" signal is transmitted from the probe unit 110 to the receiver 240 via the probe interface 230. The receiver 240 may then shape and process the data signal from the probe unit 110 (e.g., the "bounce back" signal) and may provide the shaped data signals to an imager 250. In some embodiments, the receiver 240 may shape or process the signals by analog-to-digital conversion or by performing noise reduction or noise filtering. The receiver 240 may also receive and shape or process data signals from at least one of the external units 120. Thus, the imager 250 may be coupled to the receiver 240 and to a display 140. The imager 250 may generate display signals based on the data signals received from the receiver 240. The display signals may then be transmitted from the imager 250 to the display 140 to be displayed as an image, text and/or video. In other embodiments, the receiver 240 may further provide the data signals from the probe unit 110 to the processing element 260 to analyze the data signals and assess whether the next task action in the task list can start. For example, the probe unit 120 may transmit a data signal to the adaptive scheduler 105 via the probe interface 230, the data signal may be processed by the receiver 240 and provided to the processing element 260 that analyzes the shaped data signal and determines that the shaped data signal provides the results of a B-Mode beam firing which indicates that the task action of beam firing from the B-Mode beam is completed. Accordingly, in this example, the processing element 260 of the adaptive scheduler 105 determines that beam having a lower priority than the B-Mode beam may start its task action without interfering with the B-Mode beam's task actions. As illustrated in FIG. 2, the beamer 220, the receiver 240 and the imager 250 are coupled to the processing element 260 (e.g., processor, a digital signal processor, microprocessor, application specific integrated circuit, a micro-controller, application-specific integrated circuit (ASIC) and/or field-programmable gate array (FPGA), etc.) that may further be coupled to a memory 125. The memory 125 contains instructions that when executed by the processor element 260 cause the processing unit 120 (or the processor element 260) to control the adaptive scheduler 105 to adaptively schedule the tasks performed by the system 100 as described herein. For instance, the execution of the instructions stored in memory 125 may cause the processor element 260 to (i) signal to the beamer 220 to generate signals that cause the probes 110 to fire their beams and to provide the signals to the probes 110 via the probe interface 230, (ii) configure the receiver 240 to receive data signals from the probe 110 and/or the external units 120, and (iii) signal to the imager 250 to generate display signals based on the data signals received from the receiver 240. In another embodiment, as discussed above, the instructions stored in the memory 125 may be executed by a processor that is included in the processing unit 120 that is separate from the adaptive scheduler 105. The memory 125 may be further used to store data at least images generated by the imager 250. In one embodiment, the processing unit 120 may be implemented as a monolithic integrated circuit (IC) which may or may not include certain elements thereof. For example, high voltage generator 210 may be implemented off-chip. Furthermore, the system 120 may be implemented in whole or in part on a monolithic IC, including but not limited to a system-on-chip (SoC) implementation.

In one embodiment, the adaptive scheduler 105 obtains a task list that includes a plurality of task actions. Each of the task actions may include a plurality of task instructions to be executed by the processing element 260. The processing element 260 of the adaptive scheduler executes instructions, having a length of, for example, 64 bits. Each instruction may have an operation code that may be, for example, an 8-bit operation code identifying the instruction type. Instruction types include halt, soft-timed-pulse, hard-timed-pulse, write-PI, set-reg, add-reg, goto, and conditional goto. The soft-timed-pulse and hard-timed-pulse instructions are examples of "timed" instructions. The other instructions listed above (e.g., halt, write-PI, set-reg, add-reg, goto, and conditional goto) are not "timed" instructions. The "timed" instructions may include a timestamp field, having a length of, for example, 32-bits, and a hardware-enable field, having a length of, for example, 32-bits. The processing element 260 may include a global clock counter which it uses for comparison with 32-bit timestamp value stored in the timestamp field of the "timed" instructions. The timestamp value indicates the time at which the timed instruction is to be executed. The processing element 260 may use the value stored in the hardware-enable field to determine which hardware elements need to be available before the execution of the "timed" instruction. The hardware-enable field may be an array of bits and each of the bits refers to a hardware element. For instance, if a mechanical arm corresponds to the first position in the array and the first position of the array is set to high ("1"), this hardware-enable field indicates that the mechanical arm needs to be available before the execution of this timed instruction. Conversely, if the bit is set to low ("0") in the first position in the array, the mechanical arm is not required to be available before execution of this timed instruction.

The soft-timed-pulse instruction specifies a "soft" timing constraint that causes the processing element 260 to wait for the required devices to become available and does not signal a timing violation if the required devices are not available at the required time. The hard-timed-pulse instruction specifies a "hard" timing constraint and the processing unit 120 signals a timing violation if the required devices are not available at the required time.

The halt instruction causes the processing element 260 to stop execution of further instructions. The goto and conditional goto instructions cause the processing element 260 to change execution order of the instructions. The goto and conditional goto instructions include a goto-address field that the processing unit loads into the program counter. The set-reg instructions cause the processing element 260 to set the value of a specified register. The add-reg instructions cause the processing element 260 to add a value to a specified register. The set-reg and add-reg instructions can be used to change the value of the global clock counter. The write_PI instruction writes a value to a specified address.

The processing element 260 utilizes control bits for signaling timing violations and for controlling timing violation behavior. The control bits include the halt-control-bit and the signal-control-bit that may be stored in the memory 125. A halt-control-bit indicates if the processing element 260 should halt execution of further instructions when it encounters a timing violation. The setting and unsetting of the halt-control bit may be controlled by the processing unit 120. The processing element 260 sets the signal-control-bit when it detects a timing violation. The processing unit 120 can test the value of signal-control-bit to see if the processing element 260 had a timing violation.

The following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 3:
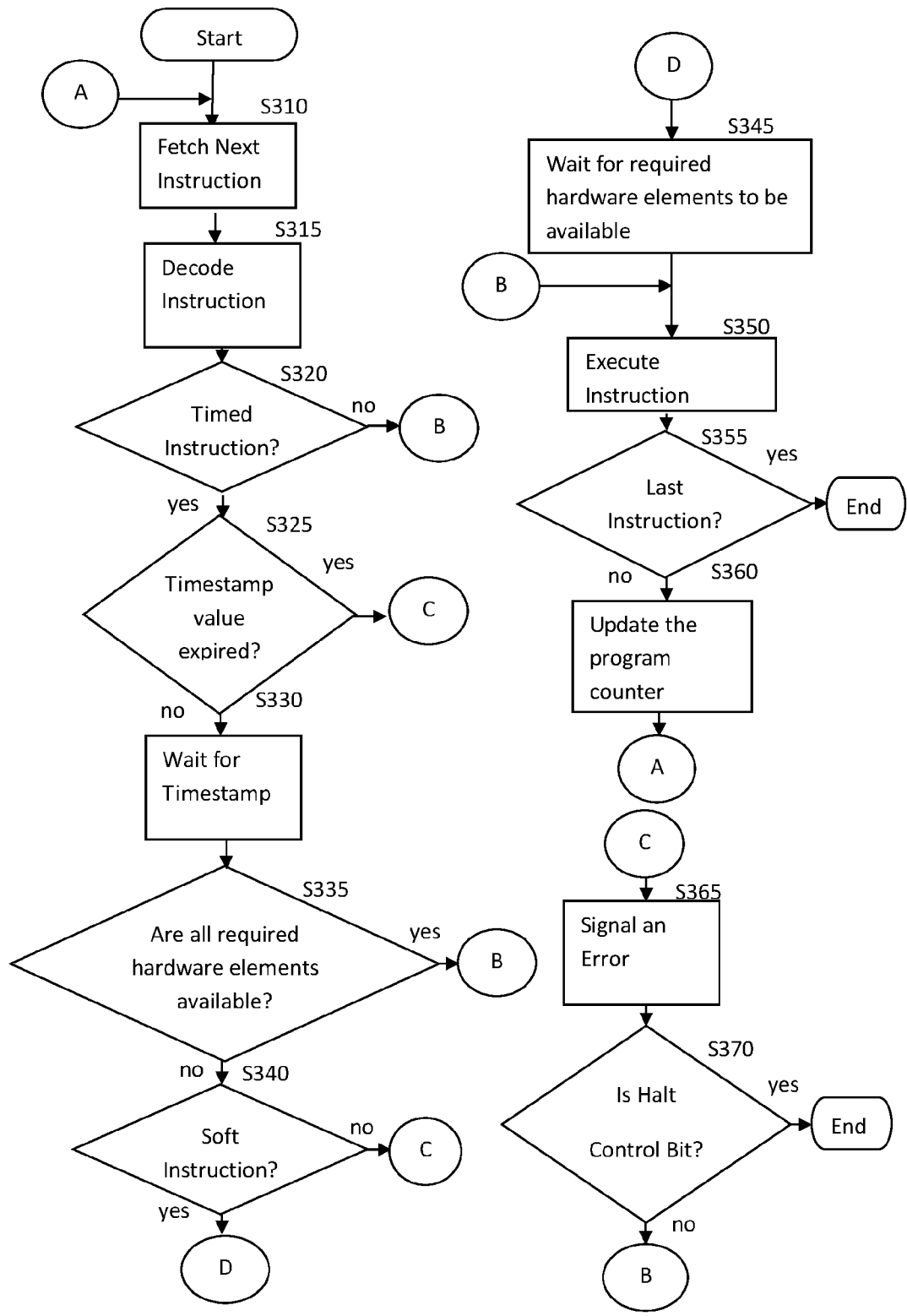
FIG. 3 shows a flowchart of an example method for real time execution of ultrasound system actions by the processing unit according to an embodiment of the invention.

FIG. 3 shows a flowchart of an example method 300 for real time execution of ultrasound system actions by the processing unit according to an embodiment of the invention. In S310, the processing element 260 fetches the next task action (e.g., next instruction) in a task list from the memory 125. In S315, the processing element 260 decodes the instruction and examines the operation code to determine if the instruction is a timed instruction. In S320, the method 300 continues to S350 if the instruction is not determined to be a timed instruction in S315. If the instruction is determined to be a timed instruction in S315, the method 300 continues with S325. In S325, the processing element 260 checks the timing deadline included in the instruction and determines if the instruction has already missed the timing deadline. This may be achieved by comparing the timestamp that is stored in the timestamp field included in the instruction to a global clock counter. If the timing deadline was missed then the method 300 continues to S365. If the timing deadline was not missed, the method 300 continues to S330. In S330, the processing element 260 waits for the timing deadline specified by the instruction's timestamp. In S335, the processing element 260 checks if the necessary hardware elements are available for use. The instruction may contain an array of bits that indicate which hardware elements need to be available. If, in S335, the processing element 260 determines that all required hardware elements are available, the process 300 continues to S350. If, in S335, the processing element 260 determines that all the required hardware elements are not available, the process 300 continues to S340. In S340, the processing element 260 handles the situation where one or more required hardware elements are busy. Accordingly, the processing element 260 determines, by analyzing the instruction's operation code, if the instruction has a hard timing constraint or a soft timing constraint. If the instruction is determined to have a hard timing constraint, the process 300 continues to S365 and if the instruction is determined to have a soft timing constraint, the process 300 continues to S345. In S345, the processing element 260 handles the soft timing constraint by waiting for the currently unavailable required hardware elements to become available. In one embodiment, while the processing element 260 waits at S345 for the hardware elements to become available, the processing element 260 stalls the global clock counter. When the required hardware elements become available, the processing element 260 proceeds to S350. In some embodiments, the processing element 260 restarts the global clock counter once the required hardware elements become available.

In S350, the processing element 260 executes the fetched instruction. In S355, the processing unit 120 checks if the fetched instruction that it has executed in S350 is the last instruction. If it has executed the last instruction, the process 300 ends. If it has not executed the last instruction, the process 300 continues to S360. In S360, the processing element 260 updates the program counter and the process 300 continues to S310. In one embodiment, in S360, the processing element 260 may update the program counter by replacing its contents with the "goto address" of a goto instruction. In this embodiment, the fetched instruction is the goto instruction. In another embodiment, in S360, the processing element 260 may update the program counter by incrementing it.

In S365, the processing element 260 sets an error control bit to indicate a timing violation. In S370, the processing element 260 checks a halt-control-bit. If the halt-control-bit is set, the process 300 ends and the processing element 260 may stop processing further instructions. If the halt-control-bit is not set, the process 300 continues to S350.

An embodiment of the invention may be a machine-readable medium having stored thereon instructions which program a processor to perform some or all of the operations described above. A machine-readable medium may include any mechanism for storing or transmitting information in a form readable by a machine (e.g., a computer), such as Compact Disc Read-Only Memory (CD-ROMs), Digital Versatile Disc (DVD), Flash Memory, Read-Only Memory (ROMs), Random Access Memory (RAM), and Erasable Programmable Read-Only Memory (EPROM). In other embodiments, some of these operations might be performed by specific hardware components that contain hardwired logic. Those operations might alternatively be performed by any combination of programmable computer components and fixed hardware circuit components.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

The invention claimed is:

1. An apparatus for real-time execution of ultrasound system actions comprising:
a processor; and
a memory to store instructions, which when executed by the processor, causes the processor to:
receive a task list including a plurality of task actions that is used by an adaptive scheduler on a target, the plurality of task actions includes a next task action in the task list, wherein each of the task actions includes a plurality of task instructions to be executed by the processor;
adaptively modifying the task list based on determining by the processor if a next task action in the task list can start, wherein determining if a next task action in the task list can start includes:
determining whether a next task instruction included in the next task action is a timed instruction to be executed by the processor, wherein the timed instruction includes a plurality of instruction fields including a timestamp field and a hardware-enable field, wherein the timestamp field includes a number of bits that represent a time value indicating a time at which the next task action is to be executed,
wherein the hardware-enable field includes a number of bits that indicate hardware elements that need to be available before execution of the timed instruction,
when the processor determines that the next task instruction is not a timed instruction, executing the task instruction,
when the processor determines that the task instruction is a timed instruction, determining whether the time value has expired,
when the processor determines that the time value has expired, signaling an error has occurred and the next task action cannot start, and
when the processor determines that the time value has not expired, waiting for the time indicated by the time value and signaling the next task action can start at the time indicated by the time value.

2. The apparatus of claim 1, wherein the memory to further store instructions, which when executed by the processor, causes the processor to:
read from the memory a halt bit after signaling the error;
halt processing the task list when the halt bit is set, and continue processing the next task action when the halt bit is not set.

3. The apparatus of claim 1, wherein, when the processor determines that the time has not expired and waits for the time value, the memory to further store instructions, which when executed by the processor, causes the processor to:
determine whether the hardware elements that are indicated in the hardware-enable field are available, and
execute the next task instruction when the hardware elements are available.

4. The apparatus of claim 3, wherein, when the processor determines that the hardware elements are not available, the memory to further store instructions, which when executed by the processor, causes the processor to:
determine whether the next task instruction is a soft timing constraint or a hard timing constraint, and
signal an error when the next task instruction is determined to be a hard timing constraint and waiting for the hardware elements to become available when the next task instruction is determined to be a soft timing constraint.

5. The apparatus of claim 4, wherein, when the next task instruction is determined to be a soft timing constraint, the memory to further store instructions, which when executed by the processor, causes the processor to:
stall a global clock timer.

6. The apparatus of claim 1, wherein determining whether the time value has expired includes comparing the time value to a time indicated on a global clock.

7. The apparatus of claim 3, further comprising:
a beamer coupled to the processor, to generate signals, wherein the processor executing the next task instruction includes signaling to the beamer to generate signals.

8. The apparatus of claim 7, further comprising:
a probe interface coupled to the beamer, the probe interface to transmit the signals to at least one probe unit and to receive signals from the at least one the probe unit.

9. The apparatus of claim 8, further comprising:
a receiver coupled to the processor and the probe interface, the receiver to receive and process the signals received from the probe interface.

10. The apparatus of claim 7, wherein the signals cause the probe units to fire their beams, respectively.

11. The apparatus of claim 10, wherein the beams include at least one of ultrasound beams or laser beams.

12. The apparatus of claim 1, wherein, when the next task instruction is determined to be a non timing instruction, the memory to further store instructions, which when executed by the processor, causes the processor to: change a value of a global clock timer.

13. A system for real-time execution of ultrasound system actions comprising:
at least one probe unit,
an input device to receive a task list inputted by a user;
an adaptive scheduler including:
a processor, and
a memory to store instructions, which when executed by the processor, causes the processor to:
receive a task list including a plurality of task actions that is used by the adaptive scheduler on a target, the plurality of task actions includes a next task action in the task list, wherein each of the task actions includes a plurality of task instructions to be executed by the processor,
adaptively modify the task list based on determining by the processor if a next task action in the task list can start, wherein determining if a next task action in the task list can start includes:
determining whether a next task instruction included in the next task action is a timed instruction to be executed by the processor, wherein the timed instruction includes a plurality of instruction fields including a timestamp field and a hardware-enable field,
wherein the timestamp field includes a number of bits that represent a time value indicating a time at which the next task instruction is to be executed,
wherein the hardware-enable field include a number of bits that indicate hardware elements that need to be available before execution of the timed instruction, when the processor determines that the next task instruction is not a timed instruction, executing the next task instruction, and when the processor determines that the next task instruction is a timed instruction, determining whether the time value has expired, and when the processor determines that the time value has expired, signaling an error has occurred and the next task action cannot start, and when the processor determines that the time value has not expired, waiting for the time indicated by the time value and signaling the next task action can start at the time indicated by the time value.

14. The system of claim 13, wherein the memory to further store instructions, which when executed by the processor, causes the processor to:

read from the memory a halt bit after signaling the error;
halt processing the task list when the halt bit is set, and continue processing the next task instruction when the halt bit is not set.

15. The system of claim 13, wherein, when the processor determines that the time has not expired and waits for the time value, the memory to further store instructions, which when executed by the processor, causes the processor to:

determine whether the hardware elements that are indicated in the hardware-enable field are available, and
execute the next task instruction when the hardware elements are available.

16. The system of claim 15, wherein, when the processor determines that the hardware elements are not available, the memory to further store instructions, which when executed by the processor, causes the processor to:

determine whether the next task instruction is a soft timing constraint or a hard timing constraint, and
signal an error when the next task instruction is determined to be a hard timing constraint and waiting for the hardware elements to become available when the next task instruction is determined to be a soft timing constraint.

17. The system of claim 16, wherein, when the next task instruction is determined to be a soft timing constraint, the memory to further store instructions, which when executed by the processor, causes the processor to:

stall a global clock timer.

18. The system of claim 13, wherein determining whether the time value has expired includes comparing the time value to a time indicated on a global clock.

19. The system of claim 15, wherein the adaptive scheduler further comprises:

a beamer coupled to the processor, to generate signals, wherein the processor executing the next task instruction includes signaling to the beamer to generate signals;

a probe interface coupled to the beamer, the probe interface to transmit the signals to the at least one probe unit and to receive signals from the at least one the probe unit; and a receiver coupled to the processor and the probe interface, the receiver to receive and process the signals received from the probe interface.

20. The system of claim 19, further comprising:

an imager to generate display signals based on the data signals received from the receiver and to transmit the display signals to a display that displays at least one of: images based on the display signals, texts based on the display signals, or video based on the display signals.

21. A method for real-time execution of ultrasound system actions comprising:

receiving by an electronic circuit included in an adaptive scheduler a task list including a plurality of task actions that is used by the adaptive scheduler on a target, the plurality of task actions includes a next task action in the task list, wherein each of the task actions includes a plurality of task instructions to be executed by the electronic device; and adaptively modify by the electronic device the task list based on determining by the electronic device if a next task action in the task list can start, wherein determining if a next task action in the task list can start includes:

determining by the electronic circuit whether a next task instruction included in the next task action is a timed instruction to be executed by a processor, wherein the timed instruction includes a plurality of instruction fields including a timestamp field and a hardware-enable field, wherein the timestamp field includes a number of bits that represent a time value indicating a time at which the next task action is to be executed, wherein the hardware-enable field includes a number of bits that indicate hardware elements that need to be available before execution of the timed instruction, when the electronic circuit determines that the next task instruction is not a timed instruction, executing the task instruction, and when the electronic circuit determines that the task instruction is a timed instruction, determining whether the time value has expired, and when the electronic circuit determines that the time value has expired, signaling by the electronic circuit that an error has occurred and the next task action cannot start, and when the electronic circuit determines that the time value has not expired, waiting by the electronic circuit for the time indicated by the time value and signaling the next task action can start at the time indicated by the time value.

22. The method of claim 21, further comprising:

reading by the electronic circuit from the memory a halt bit after signaling the error;
halting by the electronic circuit processing the task list when the halt bit is set, and
continue processing the next task action when the halt bit is not set.

23. The method of claim 21, further comprising, when the electronic circuit determines that the time has not expired and waits for the time value:

determining by the electronic circuit whether the hardware elements that are indicated in the hardware-enable field are available, and
executing by the electronic circuit the next task instruction when the hardware elements are available.

24. The method of claim 23, further comprising, when the processor determines that the hardware elements are not available:

determining by the electronic circuit whether the next task instruction is a soft timing constraint or a hard timing constraint, and
signaling by the electronic circuit an error when the next task instruction is determined to be a hard timing constraint and waiting for the hardware elements to become available when the next task instruction is determined to be a soft timing constraint.

25. The method of claim 24, further comprising, when the next task instruction is determined to be a soft timing constraint:
    stalling by the electronic circuit a global clock timer.

\* \* \* \* \*